Feb. 26, 1963   C. A. READY   3,078,628
PACKAGING APPARATUS

Filed Nov. 16, 1960   2 Sheets-Sheet 1

Feb. 26, 1963   C. A. READY   3,078,628
PACKAGING APPARATUS
Filed Nov. 16, 1960   2 Sheets-Sheet 2

3,078,628
PACKAGING APPARATUS
Charles A. Ready, Fountain Inn, S.C., assignor to W. R. Grace & Co., Cambridge, Mass., a corporation of Connecticut
Filed Nov. 16, 1960, Ser. No. 69,763
7 Claims. (Cl. 53—24)

This invention relates to a novel apparatus and method for packaging. More particularly, this invention relates to a novel apparatus and method for packaging comminuted or semi-solid materials in a flexible bag or container.

One object of the present invention is to provide a novel method and apparatus for packaging comminuted or semi-solid materials with a minimum of handling.

Another object is to provide a method and apparatus for inserting comminuted or semi-solid materials within flexible bags or containers.

A still further object is to provide a method and apparatus for tightly filling flexible bags or containers with comminuted or semi-solid materials.

It is also an object of the present invention to provide a method and apparatus for packaging comminuted or semi-solid food products within a flexible bag or container so as to prolong the shelf life of the product.

The apparatus of the present invention is suitable for horizontally loading or filling bags or casings with comminuted or semi-solid materials. A horizontally disposed extruder or grinder feeds the product into an extruder chute which is variable in size to accommodate different bag sizes and to facilitate placing of the bag on the extruder chute and the removal of the filled bag therefrom. A movable carriage is placed under the bag as it is filled with the product in order to support the bag and also to provide a certain degree of resistance to the movement of the bag away from the extruder chute as it is being filled with the product. A mechanism is also provided to move the carriage away from the extruder chute in order to facilitate the removal of the product-filled bag and the insertion of a new bag onto the extruder chute.

The method of the present invention involves the extrusion of the product directly into the bag or container. A suitable resistance is provided to the bag to insure that the bag will be tightly filled. This method is particularly desirable when packaging food products since a minimum of handling is required.

Figure 1:
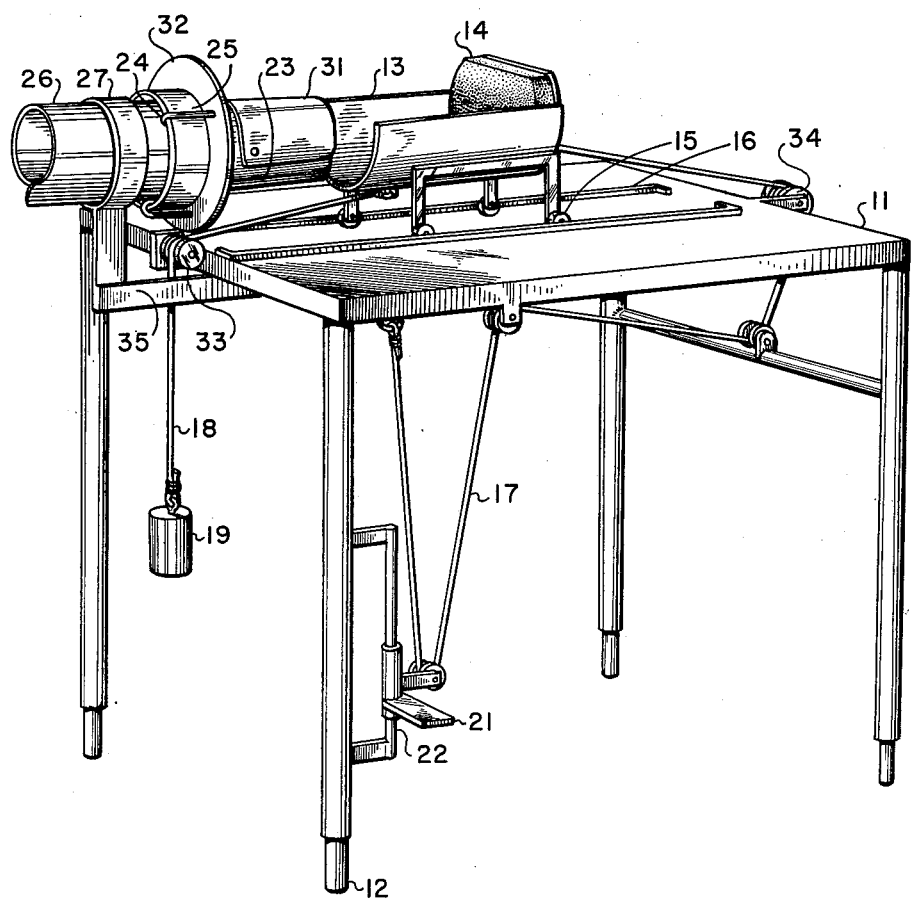
Figure 2:
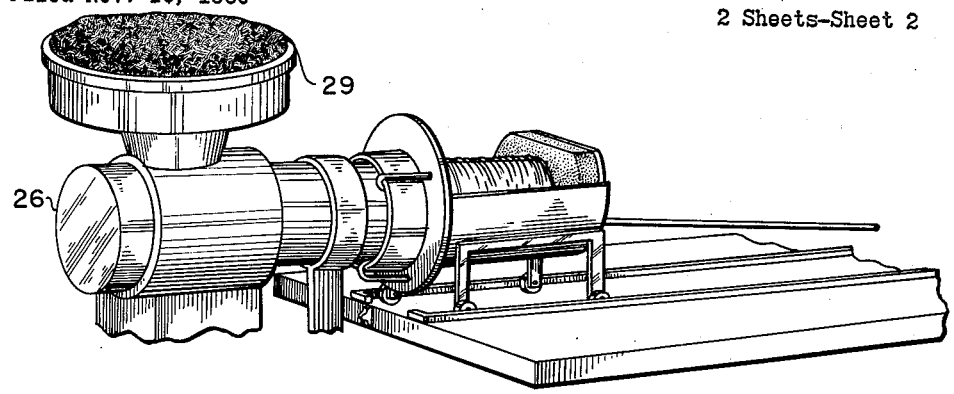
Figure 3:
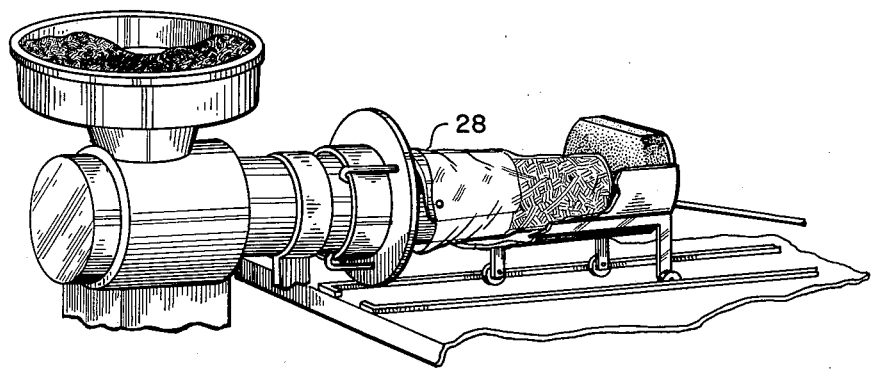
Figure 4:
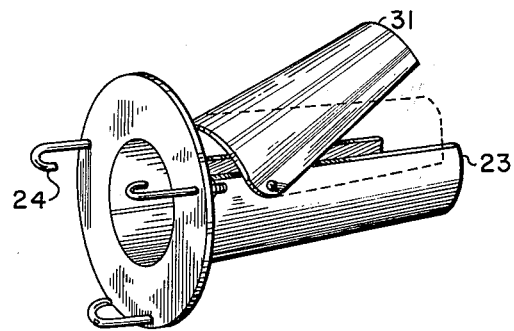

In the drawings:
FIGURE 1 is a perspective view of the apparatus of the present invention.
FIGURES 2 and 3 are perspective views of part of the apparatus illustrating its operation.
FIGURE 4 is a detail and phantom perspective of the extruder chute.

The apparatus described in FIGURE 1 includes a rectangular, flat platform or support 11 which is mounted upon four legs 12. The legs are located at each of the four corners of the support and are vertically adjustable.

There is located on the top surface of said support a pair of guide rails 16 which extend nearly the length of the support. Situated between the guide rails and resting on four rollers 15 is a carriage 13. The carriage is a longitudinal, continuous, metal channel, substantially semi-circular in cross section and open at the top and at one end. At the other end of said carriage there is attached a sponge covered butt plate which completely closes off this end. The carriage is capable of movement along the surface of the support within the confines of the guide rails. At both ends of the guide rails suitable stops are provided to prevent the carriage from travelling off the support.

A cable 18 is attached to the carriage at a point near its open end and extends from the carriage over a pully 33 located at one end of the support and downwardly to a tension weight 19 suspended over the side of the support.

A second cable 17 is attached to the carriage in the vicinity of the butt plate and extends from the carriage over a pully 34 located at the opposite end of the support and thence through a series of pulleys to a foot pedal 21 mounted on a shaft 22 secured to one of the legs of the support.

A grinder 26, the barrel of which is shown in FIGURE 1 is held in position with relation to the support by means of an attaching loop 27 fastened to the barrel of the grinder and rigidly attached to the support by a metal arm 35. At the very end of the grinder barrel there is located a raised mounting ring 25.

Positioned against the end of the grinder barrel is an extruder chute 23 which is secured to said grinder barrel by means of mounting lugs 24 which extend from the collar 32 of the extruder chute and clamp onto the mounting ring. The extruder chute, which is shown in more detail in FIGURE 4, has the form of a tapering hollow channel, approximately semi-circular in cross section. A cover piece 31 is pivotally mounted on said extruder chute. When the cover piece is closed as in FIGURE 1, the extruder chute has the general shape of a tapering open-ended tube.

In the operation of the apparatus a meat grinder 26 is attached and secured to the support 11 by means of the attaching loop 27 which is fastened to the barrel of the grinder. The extruder chute is attached to the exit opening of the grinder barrel by means of adjustable lugs 24 which function to hold the collar of the extruder chute to the mounting ring of the grinder barrel.

Depressing the foot pedal causes the carriage to travel in a direction away from the extruder chute. While the foot pedal is depressed, a flexible bag or casing 28, open at one end and slightly larger than the extruder chute, is drawn over the extruder chute until the base or bottom of said bag covers the opening of said extruder chute as shown in FIGURE 2. The foot pedal is released and the tension weight pulls the carriage, open end first, towards and under the extruder chute until the butt plate of the carriage rests against the bag which covers the open end of the extruder chute.

The product being packaged, e.g. fresh meat, is placed into a meat grinder 26 (shown in FIGURE 2) where the ground product is forced out of the grinder barrel and into the extruder chute by the action of a screw conveyor (not shown). As the product and pressure on the product build up in the extruder chute, the hinged cover piece rises until its movement is arrested by the bag or casing causing the extruder chute to conform in size to the bag or casing being used. As the product is pushed through the extruder chute it comes in contact with and pushes against the bag. Resistance to the movement of the bag off the extruder chute in response to the pressure of the product is offered by the butt plate of the carriage and the tension weight connected thereto. The amount of resistance that is to be offered to the movement of the bag off the extruder will be dependent on the weight of the tension weight suspended over the side of the support. The resistance by the carriage to the movement of the bag makes it possible to fill the bag tightly with the product. Only enough resistance should be offered to permit the bag to be tightly filled.

The bag is shown partly filled in FIGURE 3. The filled portion of the bag rests on the channel of the carriage. When the bag is filled to the desired amount, the foot pedal is depressed and the package carrier containing the filled bag is pulled away from the extruder chute. The open end of the bag is closed and secured by any conventional means, e.g. metal clips, heat sealing or tying and the filled bag is removed from the package carrier. A new bag is placed over the extruder chute, the foot pedal released and the cycle is repeated.

The extruder chute is variable in size, the variation being produced by movement of the pivoted cover piece. This facilitates placing on and removal of the bag or casing.

The apparatus of this invention makes it possible to fill the bag tightly without voids or air spaces in the package. A more attractive package is thereby produced and in the case of food packages, a product having increased shelf life and better quality is produced. In packaging ground beef it has been observed that discoloration, development of off odors and microbial populations occur most quickly around air spaces within the packages.

It is also possible, employing my apparatus, to handle larger packages than would be convenient or possible to handle by hand since the weight or burden of the packaged product would rest on the package carrier and be easily movable on such carrier.

It is obvious that this apparatus can be employed in packaging a wide range of products. It, however, has special applications for comminuted or semi-solid materials such as beef, veal, lamb, pork or any combination thereof and even thick or creamy liquids, where such materials are dispensed from a relatively horizontally disposed outlet. While the apparatus has been described in connection with a meat grinder, it is also suitable for use with such products as cottage cheese, thick creamy products, etc.

The apparatus of the present invention may be modified in various ways. In place of the tension weight there may be employed springs, hydraulic or pneumatic cylinders, etc. to provide resistance to the movement of the bag or container off the extruder chute. The foot pedal, cable and pully assembly used to draw the package carrier away from the extruder chute may be replaced by a switch actuated motor to move the package carrier away from the extruder chute.

The invention described in detail in the foregoing specification is susceptible to changes and modifications as may occur to persons skilled in the art and is not limited to the precise details of construction as shown and described herein. The terminology used in the specification is for purpose of description and not of limitation, the scope of the invention being defined in the claims.

I claim:

1. Apparatus for inserting a product into a flexible bag, comprising a support, a hollow extruder chute having an expansible discharge orifice mounted on said support, said extruder chute adapted to receive thereon an essentially non-expandable flexible bag which covers said discharge orifice, a carriage having at one end thereof a vertically extending butt plate, said carriage capable of movement under said extruder chute until its movement is arrested by the butt plate coming in contact with and covering said discharge orifice, means providing a substantially uniform yieldable resistance to the movement of said carriage away from said extruder chute, additional means capable of providing rapid movement of said carriage away from said extruder chute.

2. Apparatus for inserting a product into a flexible bag which comprises a support, a hollow extruder chute having an expansible discharge orifice mounted on said support, said extruder chute adapted to receive thereon an essentially non-expandable flexible bag which covers said discharge orifice, a carriage having at one end thereof a vertically extending butt plate, said carriage movable on a line with said extruder chute and movable under said extruder chute until its motion is arrested by the butt plate contacting and covering the discharge orifice, a first means providing a substantially uniform yieldable resistance to the movement of said carriage away from said extruder chute, a second means capable of providing rapid movement of said carriage away from said extruder chute.

3. Apparatus for inserting ground meat into a flexible bag which comprises a support, a grinder attached to said support, a hollow extruder chute mounted on the discharge end of said grinder and having an expansible discharge orifice, said extruder chute adapted to receive thereon an essentially non-expandable flexible bag which covers said discharge orifice, a carriage positioned for reciprocal movement beneath said extruder chute and having a vertical butt plate mounted at one end thereof, said butt plate positioned for contact with and covering of said discharge orifice, a first means providing a substantially uniform yieldable resistance to the movement of said carriage away from said extruder chute, and a second means capable of providing rapid movement of said carriage away from said extruder chute.

4. A method of packaging which comprises extruding a material into an essentially non-expandable flexible bag mounted on the extruder barrel, with a substantially uniform force resisting the movement of the bag off of the extruder as it is being filled to provide a tight package free from air spaces then rapidly pulling the filled bag off of the extruder barrel and closing the open end of the filled bag; said yieldable resistance being applied over the entire bottom of said bag.

5. A method of packaging which comprises extruding a comminuted material into an essentially non-expandable flexible bag mounted on the extruder barrel, with a substantially uniform force resisting the movement of the bag off of the extruder as it is being filled to provide a tight package free from air spaces then rapidly pulling the filled bag off of the extruder barrel and closing the open end of the filled bag; said yieldable resistance being applied over the entire bottom of said bag.

6. A method of packaging which comprises drawing an essentially non-expandable flexible bag open at one end over the open end of an extruder chute until the closed end of said bag covers the open end of the extruder chute, extruding a material under pressure through said extruder chute and against the closed end of said bag, filling the bag and forcing the bag off the extruder chute, with a substantially uniform force resisting the movement of said bag off of the extruder chute so that the material will be tightly packed into said bag then rapidly pulling the filled bag off of the extruder barrel and closing the open end of the filled bag; said yieldable resistance being applied over the entire bottom of said bag.

7. Packaging apparatus comprising, in combination, a supporting frame, an extruder mounted on said frame, a substantially horizontal hollow extruder chute having an expansible discharge orifice secured over the discharge end of said extruder, a carriage slidably mounted on said frame and positioned to be reciprocally moved under said discharge chute, a vertically upward extending butt plate at one end of said carriage of a size sufficient to cover the discharge opening of said chute and to limit the movement of the carriage under the chute, a first means connected adjacent the open end of said carriage providing substantially uniform yieldable resistance to movement of the carriage from beneath the chute, and a second separate means connected adjacent the butt plate end of said carriage to permit rapid reciprocal movement of said carriage.

References Cited in the file of this patent

UNITED STATES PATENTS

| | | |
|---|---|---|
| 723,072 | Thoms | Mar. 17, 1903 |
| 2,337,406 | Opie | Dec. 21, 1943 |
| 2,344,054 | Opie | Mar. 14, 1944 |
| 2,635,799 | Hoy | Apr. 21, 1953 |
| 2,686,128 | Conti | Aug. 10, 1954 |
| 2,729,947 | Cheney | Jan. 10, 1956 |
| 2,946,166 | Baxter | July 26, 1960 |